United States Patent [19]
Talarmo et al.

[11] Patent Number: 5,594,948
[45] Date of Patent: Jan. 14, 1997

[54] METHOD FOR REALISING A GROUP CALL IN A DIGITAL RADIO NETWORK

[75] Inventors: Reino Talarmo, Riihimäki; Pertti Brockman, Oulu, both of Finland

[73] Assignee: Nokia Telecommunications Oy, Espoo, Finland

[21] Appl. No.: 211,459

[22] PCT Filed: Sep. 22, 1992

[86] PCT No.: PCT/FI92/00248

§ 371 Date: Mar. 31, 1994

§ 102(e) Date: Mar. 31, 1994

[87] PCT Pub. No.: WO93/07723

PCT Pub. Date: Apr. 15, 1993

[30] Foreign Application Priority Data

Oct. 3, 1991 [FI] Finland .................. 914656

[51] Int. Cl.$^6$ .................................................. H04B 7/26
[52] U.S. Cl. .................. 455/54.2; 455/34.1; 455/56.1
[58] Field of Search ................... 455/54.1, 54.2, 455/56.1, 53.1, 57.1, 58.1, 58.2, 78, 17, 34.1, 34.2; 340/825.44

[56] References Cited

U.S. PATENT DOCUMENTS

| | | | |
|---|---|---|---|
| 4,012,597 | 3/1977 | Lynk, Jr. et al. | 455/34.1 X |
| 4,549,309 | 10/1985 | Corrigan | 455/78 |
| 4,554,677 | 11/1985 | Smith et al. | 455/54.2 |
| 4,905,302 | 2/1990 | Childress et al. | 455/54.2 X |
| 5,054,109 | 10/1991 | Blackburn | 455/54.2 X |

OTHER PUBLICATIONS

Tanenbaum, Andrew S., *Computer Networks*, 1981, pp. 249–323.

Li, Victor O. K., "Multiple Access Communications Networks", *IEEE Communications Magazine*, Jun. 1987, pp. 41–48.

*Primary Examiner*—Reinhard J. Eisenzopf
*Assistant Examiner*—Philip J. Sobutka
*Attorney, Agent, or Firm*—Cushman Darby & Cushman IP Group of Pillsbury Madison & Sutro LLP

[57] ABSTRACT

A method for realizing a group call in a digital radio network wherein a plurality of mobile subscribers participating in the group call roam within the area of at least one base station. Subscribers participating in the group call are guided one by one to talk on the same radio channel. To be able to handle the traffic in a controlled manner at all times without the subscribers congesting the radio channel by talking simultaneously, the base station is informed of the subscriber's desire to speak after the respective subscriber has indicated his or her desire to speak with predetermined signalling, the next speaker is selected at the base station on the basis of a predetermined algorithm, and the base station transmits an indication of a turn to speak to the subscriber which at the time is the next speaker.

2 Claims, 5 Drawing Sheets

METHOD FOR REALISING A GROUP CALL IN A DIGITAL RADIO NETWORK

BACKGROUND OF THE INVENTION

The invention pertains to a method for realising a group call in a digital radio network wherein a plurality of mobile subscribers participating in the group call roam within the area of at least one base station. The method is specifically designed for a trunking network, which is typically an organisation network in which all channels are in the use of several organisations and in which the subscribers have, in addition to their own subscriber numbers, group numbers indicating the subscriber group the particular subscriber belongs to. According to the method, subscribers participating in the group call are guided one by one to talk on the same radio channel.

In known (analogous) trunking radio networks realisation of a group call is based on the use of the tangent as a switch: by pressing the tangent, the transmitter switches on, and the subscriber may communicate on the channel. Pressing the tangent also mutes the earphone of the subscriber apparatus. Each subscriber may attempt to communicate whenever he or she so wishes, and it is thus possible that several subscribers attempt to communicate simultaneously without one another's knowledge. As a result, everybody's speech becomes blurred. As the earphone of each speaker is mute, he or she does not know that the channel is congested.

SUMMARY OF THE INVENTION

The object of the present invention is thus to obtain a new type of method for realising a group call in digital radio networks without the deficiencies described above. This aim is achieved with a method according to the present invention, which is characterised in that (i) the base station is informed of the subscriber's desire to speak after the subscriber has indicated his or her desire to speak with predetermined signalling, (ii) the next speaker is selected at the base station on the basis of a predetermined algorithm, and (iii) the base station transmits an indication of a turn to speak to the subscriber which at the time is the next speaker.

The basic concept of the invention is to use pressing of the tangent (or other suitable way of signalling) as an indication of the subscriber's desire to speak, and signal an indication of this to the base station, which registers at least part of the indications and selects the speakers in accordance with a predetermined algorithm.

Thanks to the solution of the invention the subscribers can never congest the traffic on the radio channel by talking at the same time, but the traffic is handled in a controlled manner at all times.

According to one preferred embodiment of the invention, the turn to speak is given to the subscriber who was the first to indicate his or her desire to speak. This may be carried out either based on competition, such that the base station receives indications of a wish to speak only after the preceding speaker has finished when the base station has informed the subscribers that the channel is available, or such that the base station receives indications of a wish to speak already during the previous turns to speak. An advantage of the former alternative is that no signalling during speech is required for realisation of the group call.

According to another preferred embodiment of the invention, the next speaker is selected among subscribers registered as wishing to speak by searching for the subscriber with the highest priority. Thus, e.g. the group leader or the person on duty may be given priority over others.

BRIEF DESCRIPTION OF THE DRAWINGS

In the following, the invention will be described in greater detail with reference to the examples of the attached drawings wherein.

DETAILED DESCRIPTION

Figure 1:
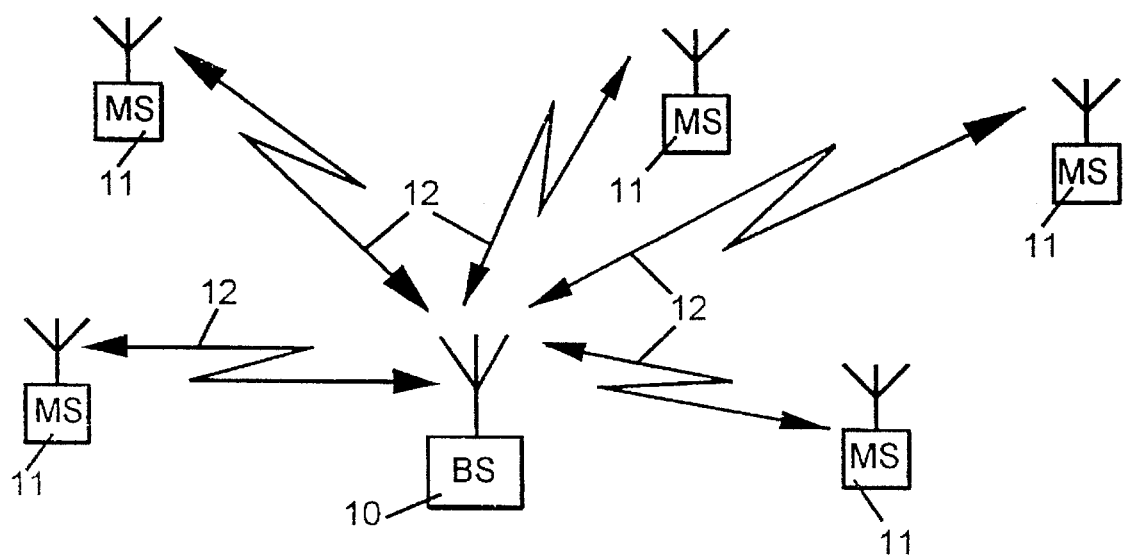
FIG. 1 schematically shows a radio network with a plurality of subscribers participating in a group call.

The method of the invention is used in a radio network of FIG. 1 comprising one or more base stations (BS) 10 and a plurality of mobile stations (MS). Each base station forms a particular radio cell and services subscribers 11 which roam within the area of its cell and are in contact with their base station by radio path 12. In the network each subscriber 11 has, in addition to its subscriber number, a group number indicating which subscriber group the subscriber belongs to.

Pressing the tangent of a mobile radio station 11 or another suitable way of signalling from the subscriber apparatus is used in accordance with the invention for informing the base station that the subscriber desires to speak. Such signalling does not, however, switch the transmitter of the mobile station on or mute its earphone, but the mobile station may continue to listen to the channel in a normal way. The mobile station carries out signalling either as soon as the tangent is pressed or immediately after the preceding speaker has finished and the base station has indicated that the channel has become available. The base station 10 thus finds out the subscribers wishing to communicate. After the preceding speaker has finished, the base station selects one of the subscribers to be the next speaker by using a predetermined algorithm for determining which subscriber to select. The selected subscriber receives from his or her subscriber apparatus an indication, such as an acoustic signal, to speak, whereafter the earphone of the respective subscriber becomes mute and the transmitter switches on.

According to the first embodiment of the method of the invention, the base station selects the next speaker by the competition method. In the competition method the subscribers compete for the channel e.g. by using a 'Slotted ALOHA' process, known per se, by transmitting an identity packet to the base station. The known 'ALOHA' and 'slotted ALOHA' methods belong to 'random access' protocols, which can be used in packet-type communication between two terminals or between a terminal and the base station. In 'ALOHA' the terminal transmits the packet as soon as it is ready to be transmitted. If several terminals try to transmit simultaneously, there is a collision, and both must retransmit the packet at a later point of time. In order to avoid recurring collisions, the re-transmission time is randomly selected for each terminal separately. In 'Slotted ALOHA', time is divided into slots of equal length (TDMA) and each terminal may transmit a packet only in the permitted time slot. Both 'ALOHA' and 'Slotted Aloha' are suitable for light-load packet traffic. With a heavy load, collisions of packets increase and the channel is congested. 'ALOHA' and 'Slotted ALOHA' are described in more detail in references [1] and [2] (cited references are listed at the end of the specification).

Figure 2A:
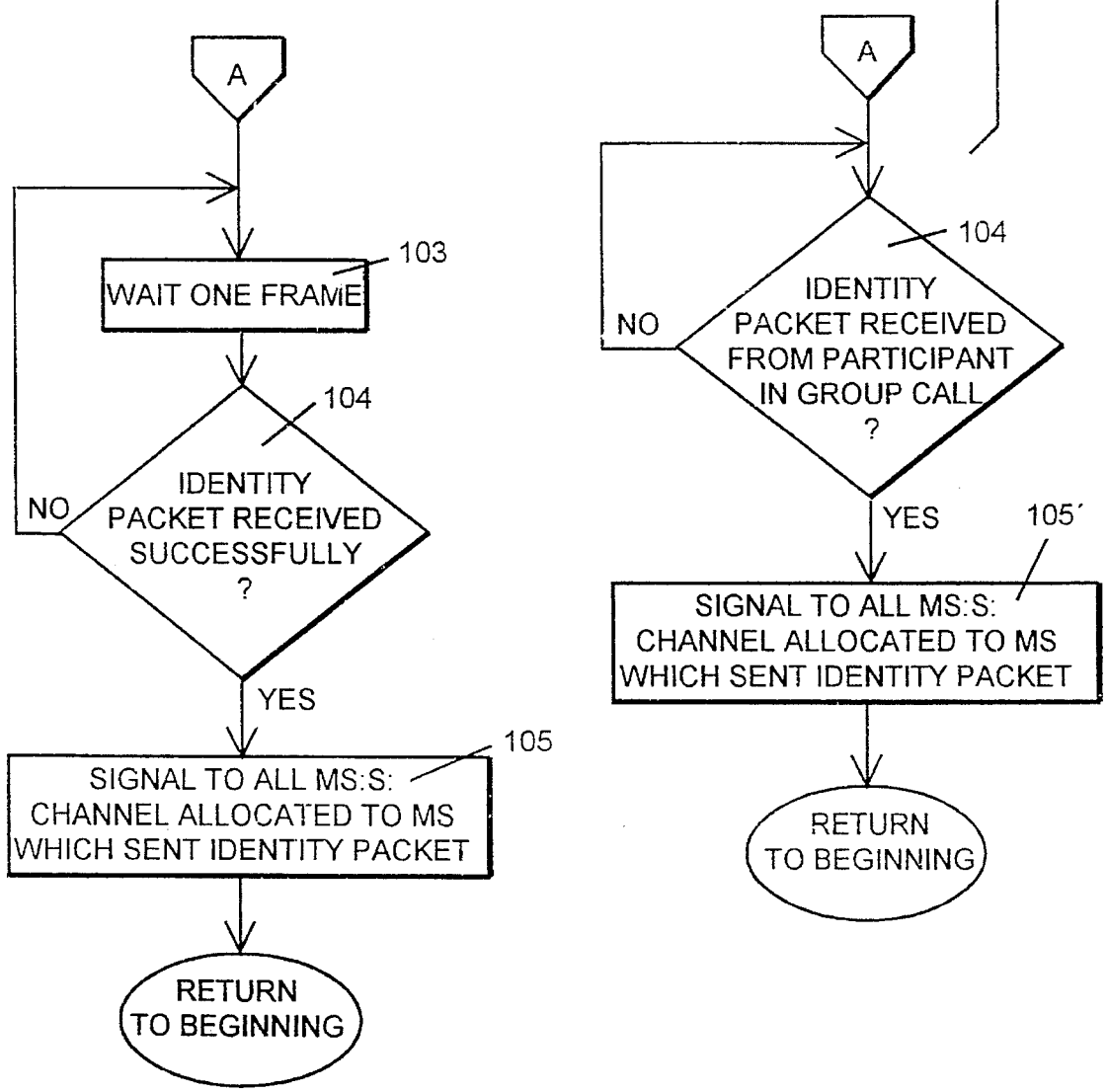
FIG. 2a is a flowchart of channel allocation in regard of the base station when the competition method is used.

In respect to the base station, channel allocation by the competition method is carried out in accordance with FIG. 2a. In the initial situation 100, the channel is controlled by a mobile station 11. When this subscriber frees the channel (e.g. by lifting the tangent) in stage 101, the base station immediately signals to all mobile stations an indication of the available channel (stage, 102). From this stage the procedure may continue in two manners depending on whether the competition takes place on a traffic channel designed for a group call or on a common signalling channel.

In the case of a traffic channel, the base station waits the time of one frame for identity packets from mobile stations (stage 103). If the identity packet is received, in stage 105 the base station signals to the mobile stations that the channel has been allocated to the subscriber which was the first to transmit an identity packet. This is carried out so that the base station transmits the identity of the selected subscriber to the mobile stations. If the identity packet is not received after the first frame (stage 104), the base station always waits the time of one frame until the first identity packet is received. Allocation of the channel is followed by return to the initial situation 100.

If the competition takes place on a signalling channel, the procedure continues after stage 102 from stage 104', in which it is determined whether what is received is the identity packet from the participant in the group call (and not, for instance, some other data transferred on the signalling channel). When such an identity packet is received, the base station signals to the mobile station in the manner described above an indication of which mobile station the channel has been allocated to. This is followed again by return to the initial situation 100.

Figure 2B:
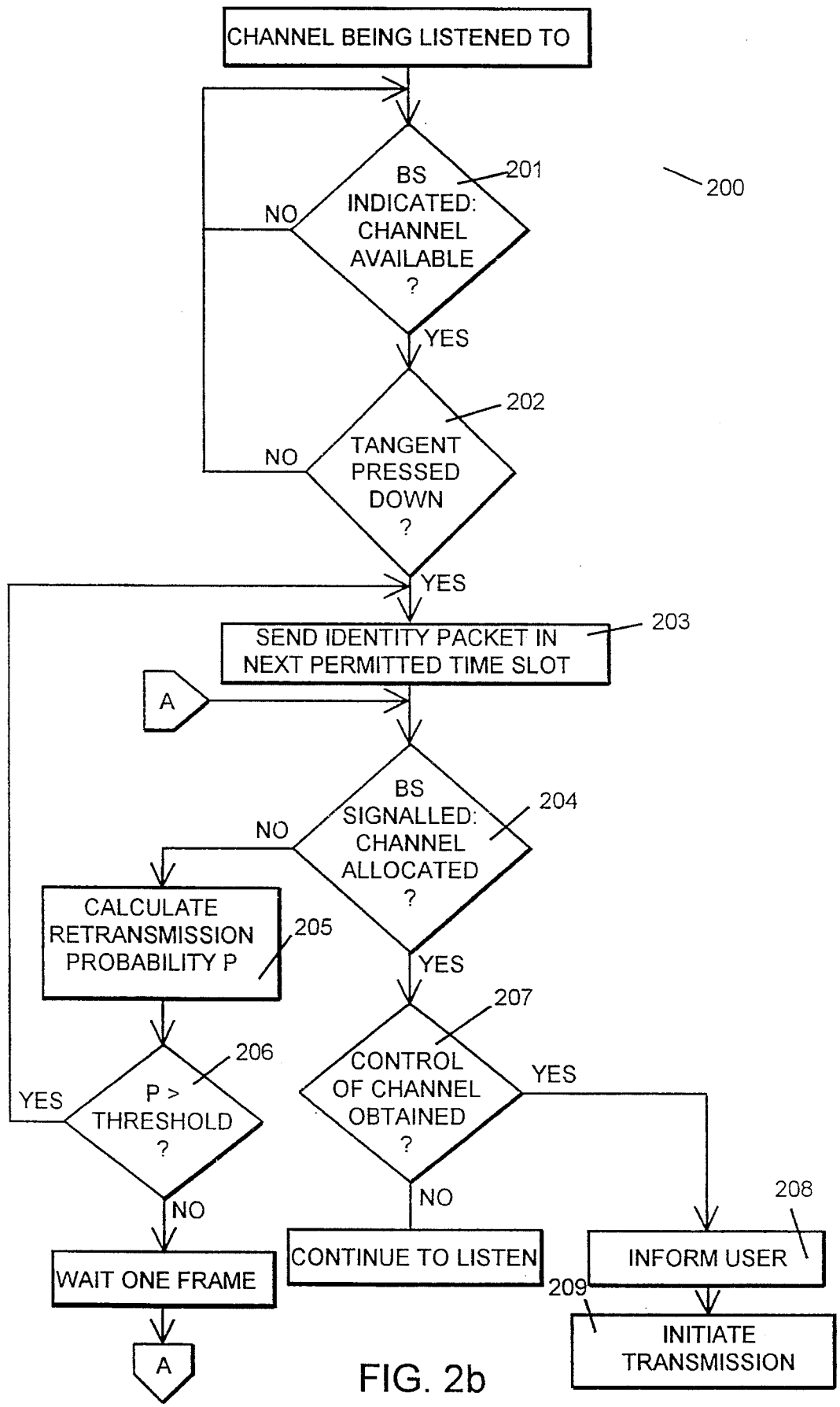
FIG. 2b is a flowchart of channel allocation in regard of a mobile station when the competition method is used.

In respect to the mobile stations, the channel allocation procedure described above is as follows (FIG. 2b). In the initial situation 200 the channel is being listened to, and each mobile station monitors, on one hand, whether the base station has indicated that the channel is available (stage 201), and on the other hand, whether the subscriber has signalled his or her desire to speak, i.e. whether the tangent is pressed down (stage 202). When the answer to both questions is affirmative, the mobile station transmits its identity packet according to 'slotted ALOHA' in the next allowed time slot (stage 203). If after this in stage 204 the base station has not signalled that the channel has been allocated, there has probably been a collision (i.e. several subscribers have transmitted their identity packet simultaneously). In such a case, the re-transmission probability p is calculated in the mobile station (stage 205), which determines whether the identity packet will be re-transmitted. If in the comparison stage 206, which comes next, it is stated that the calculated re-transmission probability p is higher than a predetermined threshold (e.g. 0.5), the subscriber apparatus returns to stage 203 by re-transmitting its identity packet. If the re-transmission probability p is lower than or equal to the value of said threshold, no re-transmission will take place, and the subscriber apparatus returns after one frame to stage 204 to monitor an indication of channel allocation from the base station. When the base station signals that the channel has been allocated to one of the subscribers (stage 204), which means that it has sent to the mobile stations the identity of the subscriber concerned, the subscriber apparatus examines (stage 207) whether the identity is its own. If the identity received by the subscriber apparatus is its own, it informs (e.g. by an acoustic signal) the subscriber of the obtained turn to speak (stage 208) and switches the transmitter on (stage 209). If the received identity is not that of the subscriber apparatus, it continues to listen to the channel in the normal manner.

In the competition method described above, the base station does not need to know in advance which mobile stations wish to have the channel. No signalling during speech is thus needed for the group call. In a typical situation in which only a few subscribers wish to speak, channel allocation takes only the time of a few frames. The different priorities the subscribers may have can be taken into account in the competition method by giving the mobile stations different re-transmission times in the case of a collision situation.

In accordance with the second, third and fourth embodiment of the invention, the base station selects the next speaker by the time-, random-, or priority method.

Figure 3A:
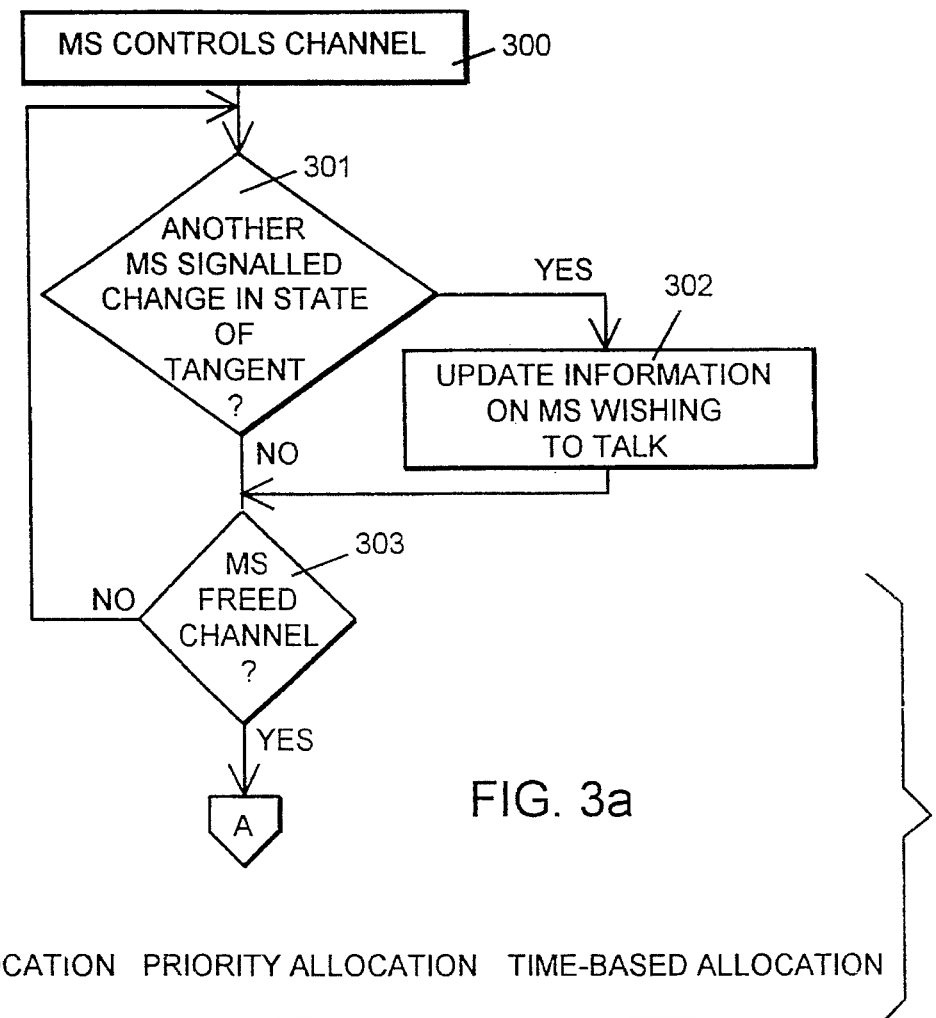
FIG. 3a is a flowchart of channel allocation in regard of the base station when the time-, random- or priority method is used.
Figure 3A:
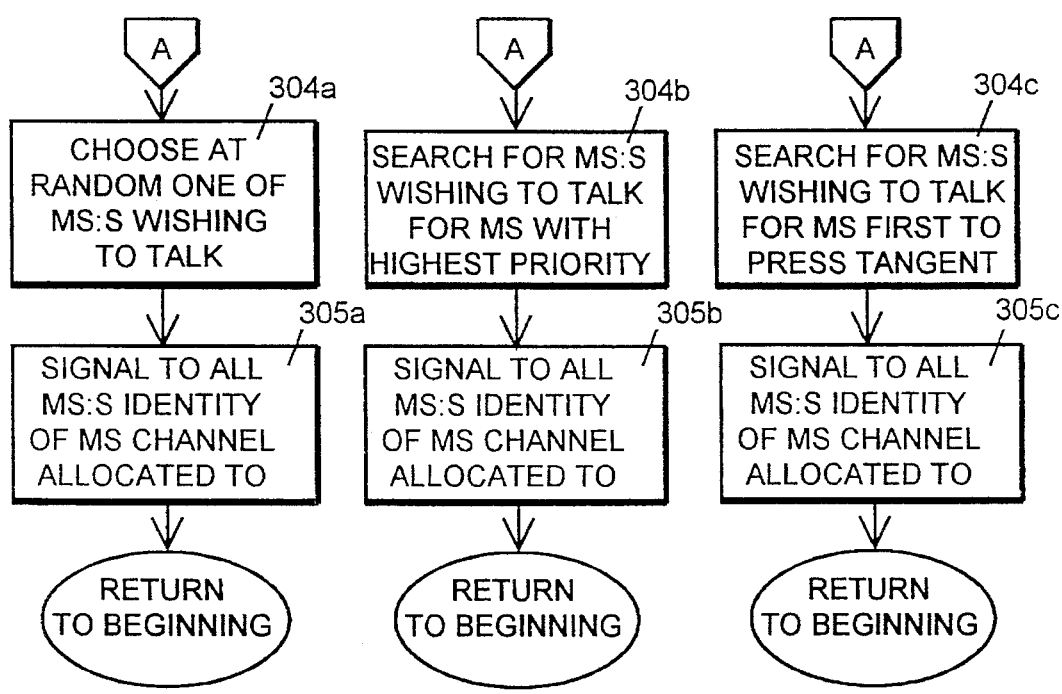
Figure 3B:
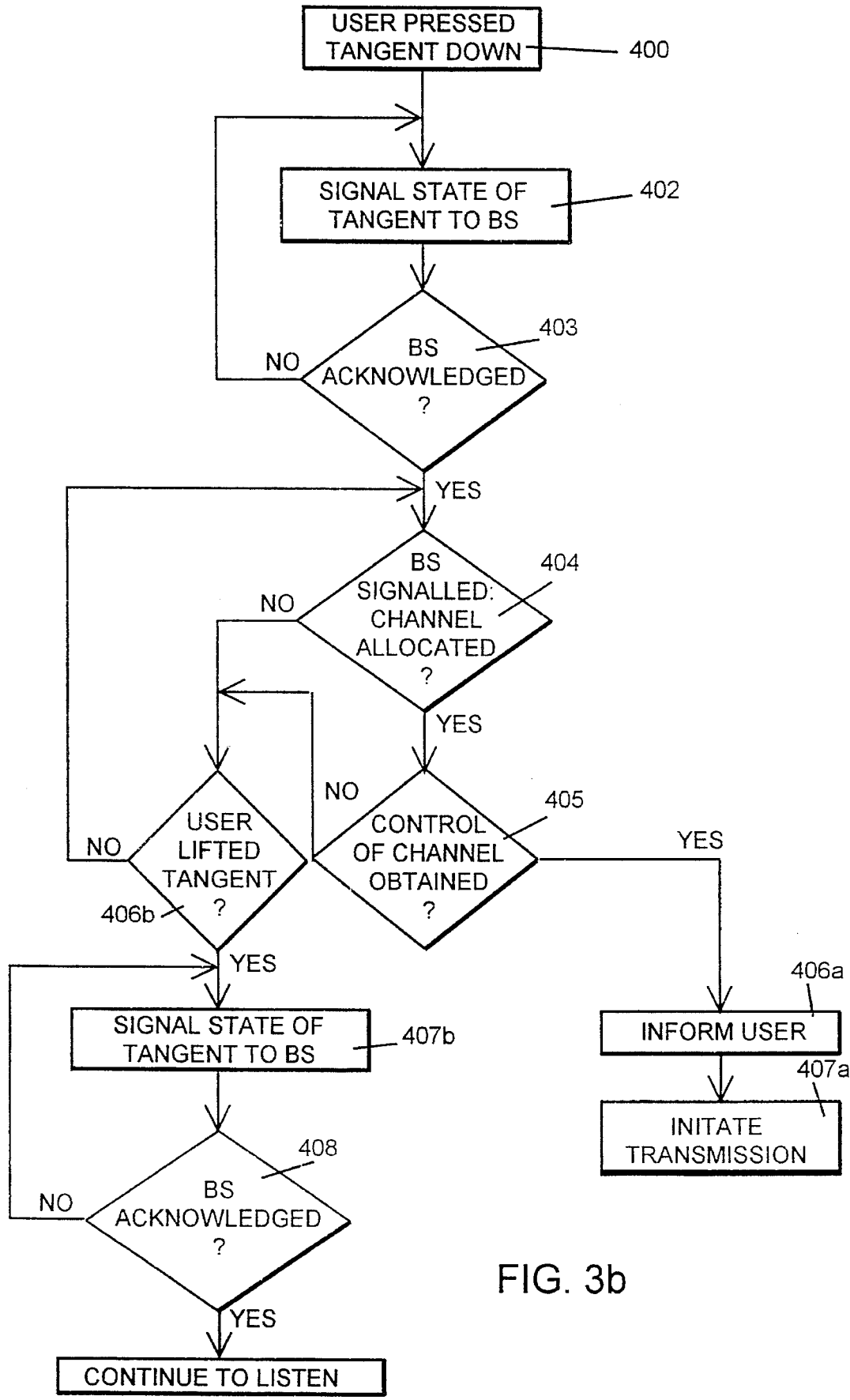
FIG. 3b is a flowchart of channel allocation in regard of a mobile station when the time-, random- or priority method is used.

In respect to the base station, the channel allocation procedure is shown in FIG. 3a. In the initial situation 300, the common channel is controlled by one of the subscribers participating in the group call. As long as the respective subscriber speaks on the channel, the base station monitors the indications from the mobile stations of a wish to speak (stage 301) and constantly updates the list of subscribers which have indicated their wish to speak (stage 302). When the currently speaking subscriber frees the channel in stage 303, the base station determines the next speaker on the basis of a predetermined algorithm. If random allocation is used, the base station selects one subscriber at random among the subscribers wishing to speak (stage 304a). If priority allocation is used, the base station searches the list of subscribers wishing to speak for the subscriber with the highest priority (304b). If, on the other hand, allocation based on time is used, the subscriber searches for the subscriber which was the first to indicate his or her desire to speak (stage 304). In the last mentioned method, all subscribers which have indicated their wish to speak need not be listed, but it suffices to keep a record of the subscriber which (probably already during the preceding turn to speak) was the first to indicate his or her desire to speak. After these three alternative stages, the base station signals the identity of the subscriber to which the channel was allocated to the subscribers participating in the group call (stage 305). This is followed again by return to stage 300, In respect to the subscribers, channel allocation is carried out by the time-, random- and priority methods in accordance with FIG. 3b. In the initial situation 400, the subscriber indicates his desire to communicate, whereupon the subscriber apparatus signals the desire to speak to the base station (stage 402) while continuing to listen to the channel. Signalling will be carried on until the base station acknowledges receipt of the message (stages 402 and 403). When an acknowledgement is received from the base station, the mobile station monitors whether the base station has indicated that the channel has been allocated to one of the subscribers (stage 404). When such a message arrives, the mobile station verifies in stage 405 whether it was the subscriber the channel was allocated to. Verification is carried out by comparing the identity transmitted by the base station with the identity of the particular mobile station. If control of the channel has been obtained, the subscriber apparatus informs the user (stage 406a) and switches on the transmitter (stage 407a). If the base station has not yet indicated that the channel has been allocated, or if in stage 405 it is noticed that the channel has been allocated to another subscriber, the mobile station checks at regular intervals whether its own user has lifted the tangent (stage 406b), in other words, whether the user has cancelled his or her indication of desire to speak. If this is the case, the base station signals the new state of the tangent to the base station (stages 407b and 408) until it receives an acknowledgement from the base station. When the acknowledgement has been received, the mobile station continues to listen to the channel and returns to stage 400 when the user presses the tangent down.

Since the mobile station immediately signals the desire to speak to the base station, the mobile stations should be able to signal to the base station while receiving speech. However, the transmitter and the receiver of the mobile station need not be switched on at the same time, for the uplink- and downlink time slots used in signalling can be placed in different places in the frame. Therefore, even though speech communication in the group call takes place in semi-duplex mode, signalling may be carried out in full-duplex mode. In the time-, random- and priority methods the change of control of the channel is carried out faster than in the competition method, because the base station is aware of the users wishing to speak as soon as the preceding speaker finishes.

Even though the invention was described above with reference to the example according to the attached drawing, it is evident that the invention is not limited thereby but may be modified in many ways within the scope of the inventive concept disclosed above and in the attached claims.

CITED REFERENCES

[1]. Li V. O. K.: Multiple Access Communications Networks, IEEE Communications Magazine, Vol. 25, No. 6, June 1987.
[2]. A. S. Tannenbaum: Computer Networks, Englewood Cliffs, Prentice Hall, 1981, Chapter 6, pp. 249–323.

We claim:

1. A method for realizing a group call, in a digital radio network in which a plurality of mobile subscribers, while participating in a group call on a same radio channel, roam within a respective area of at least one base station, comprising:
   (a) each of any of said subscribers desiring to speak signals their desire to do so, by performing a predetermining signalling;
   (b) a respective said base station, based on a predetermined algorithm, selects a next speaker at random to speak in said group call on said same radio channel; and
   (c) said base station transmits to the next speaker selected in step (b), an indication of their having been selected to be the next speaker.

2. A method for realizing a group call, in a digital radio network in which a plurality of mobile subscribers, while participating in an ongoing group call on a same radio channel, roam within a respective area of at least one base station, comprising:
   (a) each of any of said subscribers desiring to speak signals their desire to do so, by performing a predetermining signalling and continues to listen to the ongoing group call;
   (b) a respective said base station, based on a predetermined algorithm, selects a next speaker to speak in said group call on said same radio channel; and
   (c) said base station transmits to the next speaker selected in step (b), an indication of their having been selected to be the next speaker;
   in connection with conducting step (b), the respective said base station selecting as the next speaker, the subscriber who, in step (a), was first among those who signalled their desire to speak;
   step (a) being conducted while one of said subscribers is speaking in said group call, as an existing speaker, and conducting of step (a) resulting in the respective base station becoming informed of each said desire to speak immediately following conduct of each respective predetermined signalling, before said existing speaker has finished speaking;
   others of said subscribers being permitted to signal their desire to speak, while an existing speaker is speaking.

* * * * *